United States Patent
Noda et al.

(10) Patent No.: US 8,227,061 B2
(45) Date of Patent: Jul. 24, 2012

(54) HEAT RESISTANT AIR HOSE

(75) Inventors: Masashi Noda, Kounan (JP); Kazutaka Katayama, Kasugai (JP); Hiroyoshi Mori, Iwakura (JP); Yoshiki Kodaka, Kasugai (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 598 days.

(21) Appl. No.: 11/723,797

(22) Filed: Mar. 22, 2007

(65) Prior Publication Data

US 2007/0251593 A1 Nov. 1, 2007

(30) Foreign Application Priority Data

Mar. 28, 2006 (JP) ................................. 2006-089076
Mar. 15, 2007 (JP) ................................. 2007-066581

(51) Int. Cl.
*B32B 1/08* (2006.01)

(52) U.S. Cl. ...................... 428/36.1; 428/36.3; 428/36.9; 138/126; 138/123; 138/153; 138/124; 138/140

(58) Field of Classification Search .................. 138/126, 138/123, 153, 124, 140; 428/36.1, 36.3
See application file for complete search history.

(56) References Cited

U.S. PATENT DOCUMENTS

| | | | | |
|---|---|---|---|---|
| 4,259,989 A | * | 4/1981 | Lalikos et al. ................. | 138/109 |
| 4,537,829 A | * | 8/1985 | Blizzard et al. ............... | 428/429 |
| RE32,230 E | * | 8/1986 | Satoh et al. .................... | 138/126 |
| 4,989,643 A | * | 2/1991 | Walton et al. .................. | 138/126 |
| 5,093,426 A | * | 3/1992 | Sakabe et al. .................. | 525/223 |
| 5,171,787 A | * | 12/1992 | Zama et al. ..................... | 525/105 |
| 5,271,977 A | * | 12/1993 | Yoshikawa et al. ........... | 428/35.9 |
| 5,404,915 A | | 4/1995 | Miigge et al. | |
| 6,114,449 A | * | 9/2000 | Tojo et al. ....................... | 525/105 |
| 6,179,008 B1 | * | 1/2001 | Kawazura et al. ............. | 138/125 |
| 6,407,179 B1 | * | 6/2002 | Hagiwara et al. ........... | 525/330.3 |
| 6,467,509 B1 | | 10/2002 | Iio et al. | |
| 7,128,095 B2 | * | 10/2006 | Hayashi ........................... | 138/30 |
| 2002/0100516 A1 | * | 8/2002 | Powell et al. .................. | 138/125 |
| 2003/0188793 A1 | * | 10/2003 | Kanbe et al. ................... | 138/126 |
| 2004/0118469 A1 | * | 6/2004 | Wilson et al. .................. | 138/137 |

(Continued)

FOREIGN PATENT DOCUMENTS

EP 947757 A2 * 10/1999

(Continued)

OTHER PUBLICATIONS

"Acrylic Elastomers" Spelta, A. L. 2000.Kirk-Othmer Encyclopedia of Chemical Technology.*

(Continued)

*Primary Examiner* — Michele L Jacobson
(74) *Attorney, Agent, or Firm* — Westerman, Hattori, Daniels & Adrian, LLP

(57) ABSTRACT

A heat resistant air hose which is excellent in oil-bleeding resistance and causes reduced vibration noise is provided. The heat resistant air hose has an inner layer formed of an inner layer material comprising silicone rubber as a major component thereof; and an outer layer provided on an outer periphery of the inner layer and formed of an outer layer material comprising acrylic rubber as a major component thereof, and the acrylic rubber contains not less than 50 wt % of ethyl acrylate and has a dissipation factor (tan δ) of not less than 0.09 at 150 ° C. and a storage elastic modulus (E') of not less than 7.0 MPa.

13 Claims, 1 Drawing Sheet

U.S. PATENT DOCUMENTS

| | | | |
|---|---|---|---|
| 2004/0170791 A1* | 9/2004 | Yanadori | 428/36.91 |
| 2004/0226622 A1* | 11/2004 | Hayashi | 138/121 |
| 2005/0191454 A1* | 9/2005 | Kaneko et al. | 428/36.91 |
| 2005/0222341 A1* | 10/2005 | Aimura et al. | 525/329.1 |
| 2007/0186989 A1* | 8/2007 | Seyler et al. | 138/126 |
| 2008/0202618 A1* | 8/2008 | Shinohara et al. | 138/126 |

FOREIGN PATENT DOCUMENTS

| | | |
|---|---|---|
| EP | 962311 B1 | 12/2004 |
| EP | 1559538 B1 | 5/2006 |
| EP | 1676879 A2 | 7/2006 |
| JP | 03-26735 A | 2/1991 |
| JP | 6-49029 U | 7/1994 |
| JP | 8-226676 A | 9/1996 |
| JP | 2000-193152 A | 7/2000 |
| JP | 2002-228057 A | 8/2002 |
| JP | 2003-82029 A | 3/2003 |
| JP | 2004-124070 A | 4/2004 |
| JP | 2005-36967 A | 2/2005 |
| JP | 2005-214294 A | 8/2005 |
| WO | 03/025059 A1 | 3/2003 |

OTHER PUBLICATIONS

"Rubber Chemicals" Ohm, R. F. 2000. Kirk-Othmer Encyclopedia of Chemical Technology.*

"Braiding" Lee, Stuart M. (1993). Handbook of Composite Reinforcements.. John Wiley & Sons.*

Japanese Office Action dated Apr. 13, 2010, issued in corresponding Japanese Patent Application No. 2007-066581.

* cited by examiner

HEAT RESISTANT AIR HOSE

BACKGROUND OF THE INVENTION

1. Field of the Invention

The present invention relates to a heat resistant air hose to be used as a highly heat resistant air hose for transportation systems such as an automobile.

2. Description of the Art

As a material for forming a heat resistant air hose for use in automobiles or the like, acrylic rubber has conventionally been used. Tightened control on exhaust emissions and improvement of performance of supercharger (turbo charger) in high-powered engines in recent years have increased demands for extremely improved heat resistance for a heat resistant air hose. To meet such demands, silicone rubber having an excellent heat resistance is employed instead of the acrylic rubber. For example, there is proposed a hose consisting of an inner layer and an outer layer each formed of silicone rubber in which a reinforcing fiber layer is interposed between the inner layer and the outer layer. However, such a hose has a problem that the silicone rubber having insufficient oil-permeation resistance causes oil-bleeding phenomenon, that is, oil in a mist form coexisting in air flowing through the air hose penetrates the air hose from an interior surface thereof and reaches an exterior surface thereof.

To solve the above problem, there is proposed a heat resistant air hose having an inner layer formed of silicone rubber; and an innermost layer provided on an inner peripheral surface of the inner layer and formed of fluorinated rubber in, for example, Japanese Unexamined Patent Publication No. 2000-193152.

However, since the fluorinated rubber used for forming the innermost layer of the above hose is expensive, production costs of the hose are increased. Further, since the adhesion between the innermost layer of the fluorinated rubber and the inner layer formed of silicone rubber is not necessarily sufficient, interlaminar exfoliation may be caused when the hose is used as a heat resistant air hose, which may lead to various further problems. The fluorinated rubber is insufficient in low-temperature performance and also in resistance to an amine compound (amine-resistance), for example, an extreme-pressure additive, viscosity modifier or the like, added to engine oil. Further, since the above hose includes an outer layer formed of silicone rubber having a low dissipation factor (tan δ), the hose is considerably inferior in vibration transmission suppressibility, that is, the hose is inferior in suppressing transmission of vibration through the hose to conventional acrylic rubber hoses.

In view of the foregoing, it is an object of the present invention to provide a heat resistant air hose having excellent oil-bleeding resistance and vibration transmission suppressibility.

SUMMARY OF THE INVENTION

To achieve the object described above, a heat resistant air hose according to the present invention has an inner layer formed of an inner layer material comprising silicone rubber as a major component thereof; and an outer layer provided on an outer periphery of the inner layer and comprising acrylic rubber as a major component thereof, in which the acrylic rubber contains not less than 50 wt % of ethyl acrylate and has a dissipation factor (tan δ) of not less than 0.09 at 150° C. and a storage elastic modulus (E') of not less than 7.0 MPa. As mentioned above, the dissipation factor (tan δ) in the present invention refers to a value obtained at 150° C.

The inventors have conducted intensive studies for obtaining a hose having excellent oil-bleeding resistance and vibration transmission suppressibility. During their studies, they formed a hose consisting of an inner layer formed of a silicone rubber having an excellent heat resistance, and an outer layer formed of an acrylic rubber having an excellent oil-bleeding resistance. However, the resulting hose had poor vibration transmission suppressibility, that is, the hose was not capable of sufficiently suppressing transmission of vibration. As a result of further studies, they found that a hose formed with using a specific acrylic rubber of a highly-damping (highly-elastic) grade has great vibration transmission suppressibility and is excellent in suppressing transmission of vibration. Specifically, the inventors have found that a heat resistant air hose having excellent oil-bleeding resistance and vibration transmission suppressibility can be obtained by forming an outer layer of the hose with a material comprising acrylic rubber as a major component thereof, in which the acrylic rubber contains not less than 50 wt % of ethyl acrylate and has a dissipation factor (tan δ) of not less than 0.09 at 150° C. and a storage elastic modulus (E') of not less than 7.0 MPa. Thus, the inventors achieved the present invention.

In the present invention, having an excellent vibration transmission suppressibility means that transmission of vibration through a hose is well suppressed.

As described above, since the outer layer of the heat resistant air hose of the invention is formed with the outer layer material comprising acrylic rubber as a major component thereof, in which the acrylic rubber contains not less than 50 wt % of ethyl acrylate and has a dissipation factor (tan δ) of not less than 0.09 at 150° C. and a storage elastic modulus (E') of not less than 7.0 MPa, excellent oil-bleeding resistance and reduced vibration noise of the hose are achieved. Further, according to the present invention, since it is not necessary to form an innermost layer of fluorinated rubber on an inner peripheral surface of an inner layer formed of silicone rubber, the hose of the present invention is produced with lower costs and is superior in low-temperature performance and amine-resistance to the hose disclosed in the Japanese Unexamined Patent Publication No. 2000-193152.

Further, where the heat resistant air hose of the present invention further includes a braided reinforcing fiber layer having warp counts of 2 to 4 and pick counts of 30 to 50, the suppressing property of transmission of vibration noise of the hose is improved and bursting of the hose is prevented.

DESCRIPTION OF THE PREFERRED EMBODIMENTS

Embodiments of the present invention will hereinafter be described in detail.

Figure 1:
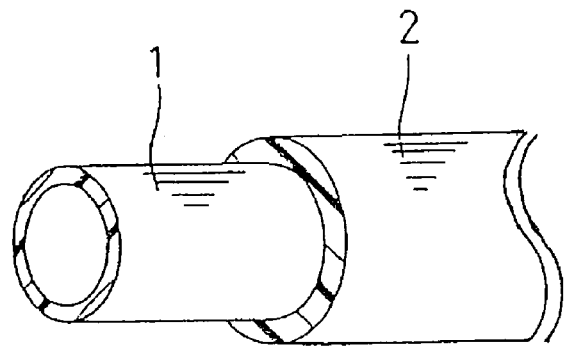
FIG. 1 is a schematic diagram illustrating a structure of an embodiment of a heat resistant air hose according to the present invention.

An embodiment of the heat resistant air hose according to the present invention consists of an inner layer 1 and an outer layer 2 directly formed on the outer peripheral surface of the inner layer as shown in FIG. 1.

A notable feature of the present invention is that the inner layer 1 is formed of an inner layer material comprising silicone rubber as a major component thereof and the outer layer 2 formed of an outer layer material comprising acrylic rubber as a major component thereof, in which the acrylic rubber contains not less than 50 wt % of ethyl acrylate and has a dissipation factor (tan δ) of not less than 0.09 at 150° C. and a storage elastic modulus (E') of not less than 7.0 MPa. Where the dissipation factor (tan δ) of the acrylic rubber is less than 0.09 at 150° C. or the storage elastic modulus (E') of the acrylic rubber is less than 7.0 MPa, the vibration transmission suppressibility is deteriorated.

The dissipation factor (tan δ) of the acrylic rubber is preferably in the range between 0.09 and 0.13, and the storage elastic modulus (E') of the acrylic rubber is preferably in the range between 7.0 MPa and 10.0 MPa.

In the present invention, the dissipation factor (tan δ) and the storage elastic modulus (E') were measured in accordance with JIS (Japanese Industrial Standards) K6394 under conditions of frequency of 10 Hz, testing temperature of 150° C. and strain amplitude of 0.5%.

As the material for forming the inner layer 1 of the hose of the invention, a silicone rubber is used as a major component. The silicone rubber is not particularly limited, but examples thereof include dimethyl silicone rubber (MQ), methylvinyl silicone rubber (VMQ), phenyl methylvinyl silicone rubber (PVMQ) and fluorosilicone rubber (FVMQ), which may be used either alone or in combination. Among these, VMQ is preferred in view of compression set and costs.

In the present invention, a major component means a component which makes up a content exceeding a half of the entire amount of the material. Therefore, the material may consist of only a major component.

The inner layer material may further contain, for example, a vulcanizing agent (organic peroxide), a colorant, a conductive agent, an antioxidant, or a metal oxide, as necessary.

As the material for forming the outer layer 2 of the hose of the invention, an acrylic rubber containing not less than 50 wt %, preferably, not less than 60 wt %, of ethyl acrylate is used as a major component. That is, though the ethyl acrylate has a high damping (elastic) effect and provides great vibration transmission suppressibility, if the ethyl acrylate contained in the acrylic rubber is less than 50 wt %, the ethyl acrylate is not capable of sufficiently suppressing transmission of vibration and does not provide the acrylic rubber with sufficient vibration transmission suppressibility.

Preferably, the acrylic rubber contains ethyl acrylate (EA) and n-butyl acrylate (BA) as essential components, and the content ratio of BA/EA is not more than 1.0, in view of excellent balance of heat resistance, oil resistance and low-temperature performance.

The acrylic rubber may further contain a copolymerizable monomer, such as methyl acrylate, methoxyethyl acrylate, ethylene, vinyl acetate, acrylonitrile.

Preferably, the acrylic rubber contains a crosslinking group comprising at least one of an epoxy group and a carboxyl group, in view of heat resistance, compression set, anti-scorching property and storage stability. Examples of a monomer for introducing the crosslinking group (crosslinking group introducing monomer) into the acrylic rubber include glycidyl methacrylate, allyl glycidyl ether, maleic monoethyl ester, and maleic monobutyl ester, which may be used either alone or in combination.

The crosslinking group introducing monomer is preferably present in a proportion of not greater than 5 wt %, more preferably not greater than 2 wt %, with respect to the whole amount of the acrylic rubber.

The outer layer material may further contain, for example, a processing aid, a carbon black, a plasticizer, an antioxidant, a vulcanizing agent, a vulcanizing aid, a vulcanization accelerator, a white filler and a flame-retardant, as necessary.

Examples of the processing aid include stearic acid, n-octadecyl amine, and polyoxyethylene stearyl ether phosphate, which may be used either alone or in combination.

The processing aid is preferably present in a proportion of 0.2 parts by weight (hereinafter referred as "parts") to 5 parts, more preferably 0.5 parts to 3 parts, based on 100 parts of the acrylic rubber, in view of anti-blooming property and compression set.

The carbon black is preferably present in a proportion of 30 parts to 100 parts, more preferably 40 parts to 80 parts, based on 100 parts of the acrylic rubber, in view of flexibility of the resulting hose.

Examples of the antioxidant include 4,4'-(α,α-dimethylbenzyl)diphenylamine. The antioxidant is preferably present in a proportion of 0.5 parts to 5 parts, more preferably 1 part to 4 parts, based on 100 parts of the acrylic rubber, in view of anti-blooming property and compression set.

Examples of the vulcanizing agent include 1-methyl-2-methylimidazol, and hexamethylenediamine carbamate, which may be used either alone or in combination.

The vulcanizing agent is preferably present in a proportion of 0.1 parts to 10 parts, more preferably 0.25 parts to 5 parts, based on 100 parts of the acrylic rubber. If the proportion of the vulcanizing agent is smaller than 0.1 parts, the resulting hose tends to have a low strength due to insufficient crosslinking. If the proportion of the vulcanizing agent is greater than 10 parts, the resulting hose tends to have a poor flexibility with high hardness.

Examples of the vulcanizing aid include trimethylthiourea, stearyltrimethylammonium bromide, and di-o-tolylguanidine, which may be used either alone or in combination.

Figure 2:
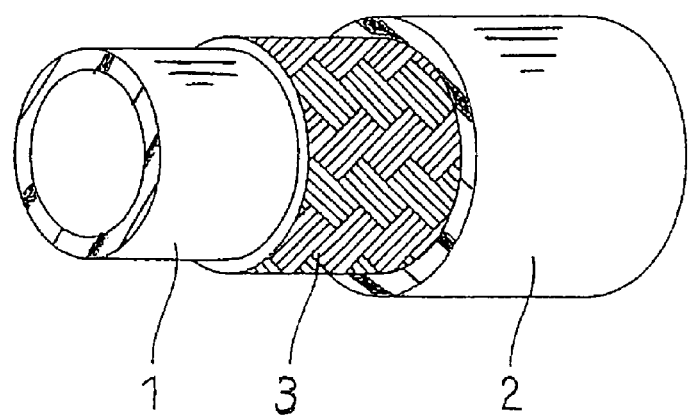
FIG. 2 is a schematic diagram illustrating a structure of another embodiment of a heat resistant air hose according to the present invention.

The structure of the heat resistant air hose according to the invention is not limited to the two-layer structure consisting of the inner layer 1 and the outer layer 2 as shown in FIG. 1, and the hose may have a structure consisting of an inner layer 1, an outer layer 2, and a reinforcing fiber layer 3 interposed therebetween, for example, as shown in FIG. 2.

Examples of a reinforcing fiber for forming the reinforcing fiber layer include a vinylon (polyvinyl alcohol) fiber, a polyamide (nylon) fiber, an aramid fiber, and polyethylene terephthalate (PET) fiber. In view of vibration transmission suppressibility, heat resistance, and pressure resistance, a para-type aromatic polyamide fiber is preferably used.

The method for weaving the above-mentioned reinforcing fibers is not specifically limited, however, examples therof include spirally winding, braiding, and knitting.

The heat resistant air hose of the invention shown in FIG. 2 is produced, for example, as follows. A silicone rubber composition is prepared by blending an appropriate amount of a vulcanizing agent (organic peroxide) into a silicone rubber such as a methylvinyl silicone rubber (VMQ), and then kneading the blend by means of a kneading machine such as a roll mill or a kneader. An acrylic rubber composition is prepared by blending an appropriate amount of a processing aid, a carbon black, a plasticizer, an antioxidant, a vulcanizing agent, a vulcanizing aid, or the like, into an acrylic rubber containing not less than 50 wt % of ethyl acrylate, and then kneading the blend by means of the kneading machine. After an unvulcanized rubber inner layer is formed by extruding the silicone rubber composition, a reinforcing fiber layer is formed on the inner layer by weaving a reinforcing fiber in such a manner as braiding the fiber on the inner layer with a predetermined warp count and a pick count. Then, an unvulcanized rubber outer layer is formed by extruding the acrylic rubber composition on the outer peripheral surface of the reinforcing fiber layer. Thus, an unvulcanized fiber-reinforced hose is obtained. A straight metal mandrel is inserted through the unvulcanized hose, and the hose is vulcanized with vapor under a predetermined condition, for example, for 1 hour under 160° C. Then, after the mandrel is removed from the hose, the hose is exposed to a secondary vulcanization in an oven under a predetermined condition, for example, for 4 hours under 200° C., so that a heat resistant air hose comprising an inner layer 1, a reinforcing fiber layer 3 formed on the outer peripheral surface of the inner layer 1, and an outer layer 2 formed on the outer peripheral surface of the reinforcing fiber layer 3 as shown in FIG. 2 was produced.

If the outer layer of the hose is formed of a silicone rubber material as in a conventional hose disclosed in the aforesaid prior art document, the above vulcanizing method using a mandrel to be inserted through the hose causes a problem that flaws or marks caused by handling during insertion of the mandrel may remain on the outer peripheral surface of the hose. The present invention advantageously solves this problem by using an acrylic rubber material for forming the outer layer of the hose.

The structure of the heat resistant air hose of the invention is not limited to the structures shown in FIGS. 1 and 2. For example, a protecting outermost layer may be formed on the outer peripheral surface of the outer layer 2.

The inner layer 1 of the heat resistant air hose of the invention preferably has a thickness of 0.5 mm to 5 mm, more preferably 1 mm to 4 mm, while the outer layer 2 preferably has a thickness of 0.5 mm to 5 mm, more preferably 1 mm to 4 mm. The heat resistant air hose of the invention preferably has an internal diameter of 20 mm to 100 mm, more preferably 30 mm to 70 mm.

Hereinafter, Examples of the invention will be described with reference to Comparative Examples. It should be noted that the present invention is not limited to the Examples.

The following silicone rubber compositions and acrylic rubber compositions were prepared for producing the hoses of Examples and Comparative Examples.

Silicone Rubber Composition

A silicone rubber composition was prepared by blending 100 parts of methylvinyl silicone rubber (VMQ) (ELASTOSIL R760/70 OH available from WACKER ASAHIKASEI SILICONE CO., LTD. of Tokyo, Japan) having a dissipation factor (tan δ) of 0.02 at 150° C., and 1.8 parts of vulcanizing agent (organic peroxide) (DS-3 available from WACKER ASAHIKASEI SILICONE CO., LTD. of Tokyo, Japan).

Acrylic Rubber Composition

Acrylic rubber compositions were prepared by blending the components listed in Table 1 at proportions shown in Table 1, and kneading the resulting blend by means of 5-liter kneader.

TABLE 1

| | ACRYLIC RUBBER COMPOSITION | | | | | | | | (Parts) |
| --- | --- | --- | --- | --- | --- | --- | --- | --- | --- |
| | A | B | C | D | E | F | a | b | c |
| Acrylic Rubber | 100 | 100 | 100 | 100 | 100 | 100 | 100 | 100 | 100 |
| | Composition (wt %) | | | | | | | | |
| Ethyl acrylate | 99 | 90 | 70 | 55 | 70 | 70 | 29 | — | — |
| n-Butyl acrylate | — | 9 | 29 | 44 | 27 | 27 | 70 | — | — |
| Methyl acrylate | — | — | — | — | — | — | — | 63 | 55 |
| Ethylene | — | — | — | — | 2 | 2 | — | 32 | 41 |
| | Crosslinking group introducing monomer (wt %) | | | | | | | | |
| Glycidyl methacrylate | 1 | 1 | 1 | 1 | 1 | — | 1 | — | — |
| Maleic monoethyl ester | — | — | — | — | — | 1 | — | 4 | 4 |
| Stearic acid | 1 | 1 | 1 | 1 | 1 | 1 | 1 | 2 | 2 |
| Carbon black | 65 | 65 | 65 | 65 | 65 | 65 | 65 | 65 | 65 |
| Plasticizer | 5 | 5 | 5 | 5 | 5 | 5 | 5 | 5 | 5 |
| Antioxidant | 2 | 2 | 2 | 2 | 2 | 2 | 2 | 2 | 2 |
| Processing aid A | — | — | — | — | — | 0.5 | — | 0.5 | 0.5 |
| Processing aid B | — | — | — | — | — | — | — | 2 | 2 |
| Vulcanizing agent A | 1 | 1 | 1 | 1 | 1 | — | 1 | — | — |
| Vulcanizing agent B | — | — | — | — | — | 0.5 | — | 1.25 | 1.25 |
| Vulcanizing aid A | 0.5 | 0.5 | 0.5 | 0.5 | 0.5 | — | 0.5 | — | — |
| Vulcanizing aid B | 0.3 | 0.3 | 0.3 | 0.3 | 0.3 | — | 0.3 | — | — |
| Vulcanizing aid C | — | — | — | — | — | 2 | — | 4 | 4 |
| tan δ of Acrylic Rubber | 0.12 | 0.11 | 0.10 | 0.09 | 0.10 | 0.11 | 0.08 | 0.15 | 0.15 |
| E' of Acrylic Rubber (MPa) | 8.5 | 8.3 | 7.8 | 7.2 | 8.0 | 9.2 | 6.5 | 4.8 | 4.7 |

The following materials were prepared for each of the components in Table 1.

Stearic acid (Processing aid)

LUNACS-30 available from Kao Corporation of Tokyo, Japan

Carbon black

SEAST SO available from Tokai Carbon Co., Ltd. of Tokyo, Japan

Plasticizer

ADK CIZER RS-735 available from ADEKA Corporation (former Asahi Denka Kogyo Co., Ltd.) of Tokyo, Japan Antioxidant 4,4'-(αα-dimethylbenzyl) diphenylamine (NAUGARD 445 available from Chemtura Corporation (former Crompton Corporation) of Connecticut, USA)

Processing aid A

N-octadecyl amine (ARMEEN 18D available from Lion Akzo Co., Ltd. of Mie, Japan)

Processing aid B

Polyoxyethylene stearyl ether phosphate (PHOSPHANOL RL210 available from Toho Chemical Industry Co., Ltd. of Tokyo, Japan)

Vulcanizing agent A 1-methyl-2-methylimidazol (SN-25 available from Shikoku Chemicals Corporation of Kagawa, Japan)

Vulcanizing agent B

Hexamethylenediamine carbamate (DIAK No.1 available from E. I. duPont de Nemours and Company of Delaware, U.S.A.)

Vulcanizing aid A

Trimethylthiourea (NOCCELER TMU available from OUCHISHINKO CHEMICAL INDUSTRIAL CO., LTD. of Tokyo, Japan)

Vulcanizing aid B

Stearyltrimethylammonium bromide (CATINAL STB available from Toho Chemical Industry Co., Ltd. of Tokyo, Japan)

Vulcanizing aid C

Di-o-tolylguanidine (NOCCELER DT available from OUCHISHINKO CHEMICAL INDUSTRIAL CO., LTD. of Tokyo, Japan)

EXAMPLE 1

An unvulcanized rubber inner layer was formed by extruding the aforementioned silicone rubber composition into a tube shape having an inner diameter of 30 mm and a thickness of 3 mm. Then, a reinforcing fiber layer was formed on the inner layer by braiding the para-type aromatic polyamide fiber having a fineness of 1000 denier (single yarn) on the inner layer at a braid angle (θ) of 55° with a predetermined warp count and a pick count. Then, an unvulcanized rubber outer layer having a thickness of 2 mm was formed by extruding the acrylic rubber composition A on the outer peripheral surface of the reinforcing fiber layer. Thus, an unvulcanized fiber-reinforced hose was obtained. After the unvulcanized hose was cut into pieces having a length of 300 mm, a straight metal mandrel having an outer diameter of 30 mm was inserted through each of the cut unvulcanized hoses. Then, the hose was vulcanized with vapor for 1 hour under 160° C., the mandrel was removed from the hose, and the hose was exposed to a secondary vulcanization in an oven for 4 hours under 200° C., whereby a heat resistant air hose comprising an inner layer 1, a reinforcing fiber layer 3 formed on the outer peripheral surface of the inner layer 1, and an outer layer 2 formed on the outer peripheral surface of the reinforcing fiber layer 3 was produced.

EXAMPLES 2 TO 6, AND COMPARATIVE EXAMPLES 1 to 5

Heat resistant air hoses were produced in the same way as the above Example 1, except that the materials for the inner layer and the outer layer were changed to materials shown in Tables 2 and 3.

TABLE 2

| | EXAMPLE | | | | | |
|---|---|---|---|---|---|---|
| | 1 | 2 | 3 | 4 | 5 | 6 |
| Inner layer | *1 | *1 | *1 | *1 | *1 | *1 |
| Reinforcing fiber layer | | | | | | |
| Reinforcing fiber | Para-type aromatic polyamide fiber having a fineness of 1000 denier (single yarn) | | | | | |

TABLE 2-continued

| | EXAMPLE | | | | | |
|---|---|---|---|---|---|---|
| | 1 | 2 | 3 | 4 | 5 | 6 |
| Warp count | 3 | 3 | 3 | 3 | 3 | 3 |
| Pick count | 40 | 40 | 40 | 40 | 40 | 40 |
| Braid angle (θ) | 55° | 55° | 55° | 55° | 55° | 55° |
| Outer layer | *2 | *3 | *4 | *5 | *6 | *7 |
| Heat resistance | ○ | ○ | ○ | ○ | ○ | ○ |
| Oil-breeding resistance | ○ | ○ | ○ | ○ | ○ | ○ |
| Vibration transmission suppressibility | ○ | ○ | ○ | ○ | ○ | ○ |

*1: Silicone rubber composition
*2: Acrylic rubber composition A
*3: Acrylic rubber composition B
*4: Acrylic rubber composition C
*5: Acrylic rubber composition D
*6: Acrylic rubber composition E
*7: Acrylic rubber composition F

TABLE 3

| | COMPARATIVE EXAMPLE | | | | | |
|---|---|---|---|---|---|---|
| | 1 | 2 | 3 | 4 | 5 | 6 |
| Innermost layer | — | — | — | — | — | *8 |
| Inner layer | *1 | *1 | *1 | *2 | *1 | *1 |
| Reinforcing fiber layer | | | | | | |
| Reinforcing fiber | Para-type aromatic polyaraide fiber having a fineness of 1000 denier (single yarn) | | | | | |
| Warp count | 3 | 3 | 3 | 3 | 3 | 3 |
| Pick count | 40 | 40 | 40 | 40 | 40 | 40 |
| Braid angle (θ) | 55° | 55° | 55° | 55° | 55° | 55° |
| Outer layer | *9 | *10 | *11 | *2 | *1 | *1 |
| Heat resistance | ○ | ○ | ○ | X | ○ | ○ |
| Oil-breeding resistance | ○ | ○ | ○ | ○ | X | ○ |
| Vibration transmission suppressibility | X | X | X | ○ | X | X |

*1: Silicone rubber composition
*2: Acrylic rubber composition A
*8: Fluoro-rubber composition
*9: Acrylic rubber composition a
*10: Acrylic rubber composition b
*11: Acrylic rubber composition c

COMPARATIVE EXAMPLE 6

[Preparation of Fluoro-Rubber Composition]

A fluoro-rubber composition was prepared by blending 100 parts of a fluoro-rubber (VITON GBL-200 available from DuPont Performance Elastomers K.K. of Tokyo, Japan), 10 parts of carbon black (ASAHI-THERMAL available fromAsahi Carbon Co., Ltd. of Niigata, Japan), 3 parts of zinc oxide (ZINCOXIDE II available from Mitsui Mining & Smelting Co., Ltd. of Tokyo, Japan), 1.3 parts of vulcanizing agent (organic peroxide) (PERHEXA 25B-40 available from NOF Corporation of Tokyo, Japan), and 2.5 parts of closslinking aid (triallyl isocyanurate) (TAIC available from Nippon Kasei Chemical Co., Ltd. of Tokyo, Japan).

[Production of a Hose]

A heat resistant air hose was produced in the same way as Comparative Example 5, except that an innermost layer formed of the fluoro-rubber composition and having a thickness of 1 mm was formed.

The properties of thus obtained heat resistant air hoses of Examples and Comparative Examples were evaluated in the following manners. The results of the evaluations are shown in Tables 2 and 3.

Heat Resistance

Each hose was incorporated in an aluminum forging pipe having a straight diameter of 31 mm in a bulge shape in accordance with JASO (Japanese Automobile Standard Organization) M101 and was fastened by worm gear clamp at a screw torque of 3N·m in accordance with JASO F207. Air heated to 200° C. was flowed inside of the hose, which raises the temperature of the outer peripheral surface of the hose to about 180° C., and the hose was allowed to stand for 500 hours in this status. Thereafter, the hose was cooled to room temperature. Thus treated hose was placed between a couple of plates to be rapidly compressed until the inner diameter of the hose was reduced by half. The hose was visually evaluated about whether there were any abnormalities such as cracks or flaws. In Tables, the symbol ○ indicates that no abnormality was observed, while the symbol X indicates that abnormalities such as cracks or flaws were observed.

Oil-Bleeding Resistance

Each hose was incorporated in an aluminum forging pipe having a straight diameter of 31 mm in a bulge shape in accordance with JASO M101 and was fastened by worm gear clamp at a screw torque of 3N·m in accordance with JASO F207. Diesel engine oil (Grade: 10W-30) was encapsulated in the hose, and the hose was allowed to stand in an explosion-proof aging bath of the temperature of 175° C. for 500 hours. Thereafter, the hose was cooled to room temperature and the diesel engine oil was withdrawn from the hose. After thus treated hose was allowed to stand for one week, oil-bleeding on the outer peripheral surface of the hose (the acrylic rubber surface) was visually evaluated. In Tables, the symbol ○ indicates that no oil-bleeding was observed, while the symbol X indicates that oil-bleeding was observed.

Vibration Transmission Suppressibility

Each hose was incorporated in an aluminum forging pipe having a straight diameter of 31 mm in a bulge shape in accordance with JASO M101 and was fastened by worm gear clamp at a screw torque of 3N·m in accordance with JASO F207. The hose was laid horizontally with one end thereof fixed and the other end connected to a vibration exciter. With applying an air pressure of 200 kPa on the inside of the hose, the end of the hose connected to the vibration exciter was vibrated at an acceleration of 5 G and a frequency of 15 Hz, and vibrations transmitted to the surface of the opposite end of the hose were measured by means of an acceleration pickup. In Tables, the symbol ○ indicates that the measured acceleration was 4 G or lower than 4 G, while the symbol X indicates that the measured acceleration was higher than 4 G.

As can be understood from the results shown in Tables 2 and 3, each hose of Examples was excellent in vibration transmission suppressibility as well as heat resistance and oil-bleeding resistance.

In contrast, each hose of Comparative Examples 1 to 3 were insufficient in vibration transmission suppressibility since the outer layer of each hose was not formed of an acrylic rubber composition containing not less than 50 wt % of ethyl acrylate. The hose of Comparative Example 4 was insufficient in heat resistance since the inner layer of the hose was formed of an acrylic rubber composition. The hose of Comparative Example 5 was insufficient in oil-bleeding resistance as well as vibration transmission suppressibility since both of the inner layer and the outer layer of the hose were formed of silicone rubber compositions. The hose of Comparative Example 6 had an improved oil-bleeding resistance as compared to the hose of Comparative Example 5 due to the innermost layer formed of a fluoro-rubber composition provided on the hose of Comparative Example 5. However, the hose of Comparative Example 6 was insufficient in vibration transmission suppressibility.

The heat resistant air hose of the present invention is generally applicable to the use as a highly heat resistant hose and particularly suitable for the use as an automobile air hose such as an air hose for supercharger through which hot air flows. However, the use of the air hose is not limited to the use as a highly heat resistant air hose for transportation systems such as an automobile, but suitably used also in the transportation systems such as tractors, cultivators, or ships.

What is claimed is:

1. A heat resistant air hose having an inner layer formed of an inner layer material comprising silicone rubber as a sole rubber component thereof; and an outer layer provided on an outer periphery of the inner layer and formed of an outer layer material comprising acrylic rubber as a sole rubber component thereof, the acrylic rubber containing n-butyl acrylate and not less than 70 wt % of ethyl acrylate and having a dissipation factor (tan δ) of not less than 0.10 at 150° C. and a storage elastic modulus (E') of not less than 7.8 MPa.

2. A heat resistant air hose as set forth in claim 1, wherein the acrylic rubber in the outer layer material contains a crosslinking group comprising at least one of an epoxy group and a carboxyl group.

3. A heat resistant air hose as set forth in claim 1, further comprising a reinforcing fiber layer interposed between the inner layer and the outer layer.

4. A heat resistant air hose as set forth in claim 3, wherein the reinforcing fiber layer comprises braided para-type aromatic polyamide materials.

5. A heat resistant air hose as set forth in claim 3, wherein the reinforcing fiber layer comprises spirally wound, braided, or knitted reinforcing fiber.

6. A heat resistant air hose as set forth in claim 5, wherein the reinforcing fiber layer comprising the braided fibers has warp counts of 2 to 4 and pick counts of 30 to 50.

7. A heat resistant air hose as set forth in claim 1, wherein the air hose is a heat resistant air hose for transportation systems.

8. A heat resistant air hose as set forth in claim 1, wherein methylvinyl silicone rubber (VMQ) is used as the silicone rubber in the inner layer material.

9. A heat resistant air hose as set forth in claim 1, wherein the acrylic rubber in the outer layer material has a dissipation factor (tan δ) in the range between 0.10 and 0.12 at 150° C. and a storage elastic modulus (E') in the range between 7.8 MPa and 9.2 MPa.

10. A heat resistant air hose as set forth in claim 1, wherein the outer layer material contains at least one of 1-methyl-2-methylimidazol and hexamethylenediamine carbamate as a vulcanizing agent.

11. A heat resistant air hose as set forth in claim 10, wherein the vulcanizing agent is present in a proportion of 0.1 parts by weight to 10 parts by weight based on 100 parts by weight of the acrylic rubber.

12. A heat resistant air hose as set forth in claim 1, wherein the outer layer material contains at least one vulcanizing agent selected from the group consisting of trimethylthiourea, stearyltrimethylammonium bromide, and di-o-tolylguanidine.

13. A heat resistant air hose as set forth in claim 12, wherein the vulcanizing agent is present in a proportion of 0.3 parts by weight to 2 parts by weight based on 100 parts by weight of the acrylic rubber.

* * * * *